United States Patent
Tsao

(10) Patent No.: US 7,379,127 B2
(45) Date of Patent: May 27, 2008

(54) ELECTROSTATIC DISCHARGE PROTECTION CIRCUIT AND METHOD OF ELECTROSTATIC DISCHARGE PROTECTION

(75) Inventor: Cheng-Han Tsao, Banciao (TW)

(73) Assignee: AU Optronics Corporation, Hsin-CHu (TW)

( * ) Notice: Subject to any disclaimer, the term of this patent is extended or adjusted under 35 U.S.C. 154(b) by 172 days.

(21) Appl. No.: 11/176,243

(22) Filed: Jul. 8, 2005

(65) Prior Publication Data
US 2006/0119757 A1 Jun. 8, 2006

(30) Foreign Application Priority Data
Dec. 8, 2004 (TW) .............................. 93138036 A

(51) Int. Cl.
*G02F 1/1333* (2006.01)
(52) U.S. Cl. .......................................... 349/40; 349/54
(58) Field of Classification Search ................. 349/40, 349/52–54; 361/56, 91.3, 111
See application file for complete search history.

(56) References Cited
U.S. PATENT DOCUMENTS

| | | | | |
|---|---|---|---|---|
| 5,606,340 | A | | 2/1997 | Suzuki et al. |
| 5,610,790 | A | * | 3/1997 | Staab et al. ..................... 361/56 |
| 5,815,360 | A | * | 9/1998 | Consiglio et al. ........... 361/118 |
| 6,043,971 | A | * | 3/2000 | Song et al. ................. 361/111 |
| 6,249,410 | B1 | * | 6/2001 | Ker et al. ...................... 361/56 |
| 6,351,362 | B1 | * | 2/2002 | Inoue et al. ................. 361/111 |
| 6,414,831 | B1 | * | 7/2002 | Orchard-Webb ............. 361/111 |
| 6,653,216 | B1 | * | 11/2003 | Shimomaki et al. ........ 438/608 |
| 2003/0235022 | A1 | * | 12/2003 | Lai et al. .................... 361/111 |

* cited by examiner

*Primary Examiner*—Andrew Schechter
*Assistant Examiner*—Lauren Nguyen
(74) *Attorney, Agent, or Firm*—Bacon & Thomas, PLLC

(57) ABSTRACT

An electrostatic discharge (ESD) protection circuit and an ESD protection method applied in a liquid crystal display are provided. The ESD protection circuit comprises a first thin film transistor (TFT), a second TFT, a first diode and a second diode. The liquid crystal display has a signal line and a common electrode. The ESD protection method comprises the following steps. When a first electrostatic charge is generated on the signal line, the corresponding voltage of the first electrostatic charge enables the first diode to be conducted, so that the first electrostatic charge is discharged to the common electrode through the first TFT. When the second electrostatic charge is generate on common electrode, the corresponding voltage of the second electrostatic charge enables the second diode to be conducted, so that the second electrostatic charge is discharged to the signal line through the second TFT.

13 Claims, 3 Drawing Sheets

ELECTROSTATIC DISCHARGE PROTECTION CIRCUIT AND METHOD OF ELECTROSTATIC DISCHARGE PROTECTION

This application claims the benefit of Taiwan application Serial No. 93138036, filed Dec. 8, 2004, the subject matter of which is incorporated herein by reference.

BACKGROUND OF THE INVENTION

1. Field of the Invention

The invention relates in general to an electrostatic discharge (ESD) protection circuit, and more particularly to a method using the corresponding voltage of the electrostatic charges to have the transistor be conducted for the electrostatic charges to be discharged promptly.

2. Description of the Related Art

Electrostatic discharge is a transfer of electrostatic deposition of electrostatic charges between different objects. The occurrence of electrostatic discharge is normally very short and has to be calculated in nano-seconds. To generate a high current within such a short time, the current is normally as high as several amperes. If a current of high amperes flows through a semiconductor integrated circuit, damage would occur.

Therefore, in a semiconductor circuit, the ESD protection circuit disposed between power lines must be able to provide a discharge path through which the generated high-voltage static electricity is discharged to protect the semiconductor integrated circuit from being damaged. Conventional liquid crystal display has an ESD protection circuit disposed between each gate line and common electrode and between each data line and common electrode to protect each pixel transistor from being damaged by the high-voltage static electricity generated. Referring to FIG. 1, a circuit diagram of an ESD protection circuit of a conventional liquid crystal display is shown. The ESD protection circuit 100 is coupled to between a gate line GL and a common electrode Vcom, comprising 6 diodes, namely, D (1)~D (6). A first discharge path R1 is formed by diodes D (1)~D (3) and a second discharge path R2 is formed by diodes D (4)~D (6). When static electricity is generated by the gate line GL, the electrostatic current is discharged to the common electrode Vcom via the discharge path R1, or the electrostatic current is discharged to the gate line GL via the discharge path R2 when the common electrode Vcom generates static electricity.

According to the design of ESD protection circuit 100, diodes D (1)~D (6) are implemented through an amorphous silicon manufacturing process. However, due to a large channel width, the area of the circuit layout of the ESD protection circuit 100 increases accordingly. Consequently, the area of liquid crystal display panel would increase and cannot be reduced. The discharge rate of the conventional ESD protection circuit 100 is not fast enough to discharge electrostatic charges of high voltages, and falls short of providing protection to pixel circuits.

SUMMARY OF THE INVENTION

The object of the invention is to provide an electrostatic discharge (ESD) protection circuit and the ESD protection method thereof, wherein the ESD protection circuit has a smaller circuit layout and better discharge efficiency of high-voltage static electricity than a conventional method.

According to an object of the invention, an ESD protection circuit applied in a liquid crystal display is provided. The liquid crystal display has a signal line and a common electrode. The ESD protection circuit comprises a first thin film transistor (TFT), a first diode, a second TFT and a second diode. The drain/source electrode and the source/drain electrode of the first TFT are respectively coupled to the signal line and the common electrode. The negative end of the first diode is coupled to the first transistor the gate electrode, while the positive end of the first diode is coupled to signal line. The drain/source electrode and the source/drain electrode of the second TFT are respectively coupled to the signal line and the common electrode. The negative end of the second diode is coupled to the gate electrode of the second transistor, while the positive end of the second diode is coupled to common electrode.

When a first electrostatic charge is generate on the signal line, the corresponding voltage of the first electrostatic charge enables the first diode to be conducted and further opens the first TFT, so that the first electrostatic charge is discharged to the common electrode through the first TFT. When a second electrostatic charge is generate on common electrode, the corresponding voltage of the second electrostatic charge enables the second diode to be conducted and further opens the second TFT, so that the second electrostatic charge is discharged to the signal line through the second TFT.

According to another object of the invention, an ESD protection method applied between the signal line and the common electrode of a liquid crystal display is provided, wherein the ESD protection method comprises the following steps of:

1. Providing an ESD protection circuit, comprising a first TFT, a second TFT, a first diode and a second diode;
2. Enabling the first diode to be conducted and the first TFT to be turned on by the corresponding voltage of the first electrostatic charge when a first electrostatic charge is generated on the signal line;
3. Having the first electrostatic charge discharged to the common electrode through the first thin film element;
4. Enabling the second diode to be conducted and the second TFT to be turned on by the corresponding voltage of the second electrostatic charge when a second electrostatic charge is generated on the signal line;
5. Having the second electrostatic charge discharged to the signal line through the second thin film element.

The drain/source electrode and the source/drain electrode of the first TFT are respectively coupled to the signal line and the common electrode. The negative end of the first diode is coupled to the gate electrode of the first transistor, while the positive end of the first diode is coupled to the signal line. The drain/source electrode and the source/drain electrode of the second TFT are respectively coupled to the signal line and the common electrode. The negative end of the second diode is coupled to the gate electrode of the second transistor, while the positive end of the second diode is coupled to common electrode.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 1:
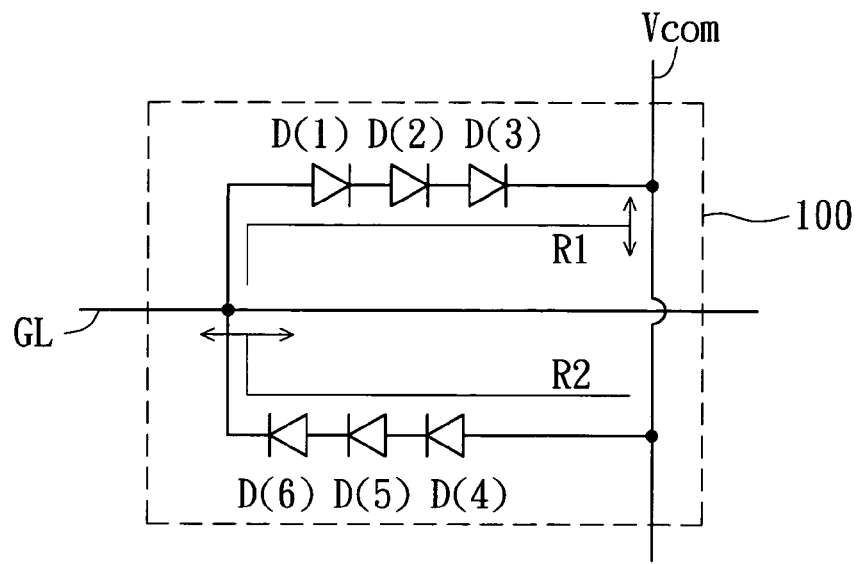
FIG. 1 is a circuit diagram of an ESD protection circuit of a conventional liquid crystal display.
Figure 2:
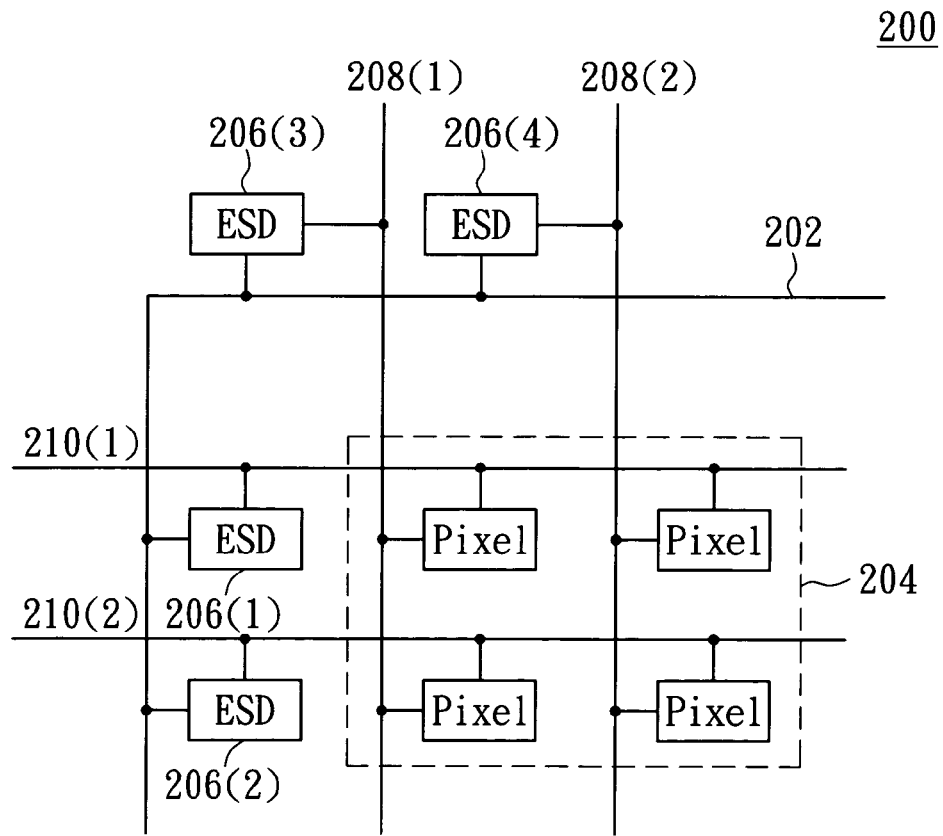
FIG. 2 is a block diagram of a liquid crystal display adopting an ESD protection circuit of the invention.

Referring to FIG. 2, a block diagram of a liquid crystal display adopting an electrostatic discharge (ESD) protection circuit of the invention is shown. Liquid crystal display 200 comprises a signal line, a common electrode 202, a pixel array 204 and a plurality of ESD protection circuits 206 (1)~(4). Each of the ESD protection circuits 206 (1)~(4) comprises a first thin film transistor (TFT) Q1, a second TFT Q2, a first diode D1' and a second diode D2', wherein Q1, Q2, D1', D2' are not shown in FIG. 2. The drain/source electrode and the source/drain electrode of the first TFT Q1 are respectively coupled to the signal line and the common electrode 202, while the drain/source electrode and the source/drain electrode of the second TFT Q2 are respectively coupled to the signal line and the common electrode 202. The negative end of the first diode D1' is coupled to the gate electrode of the first TFT Q1, while the positive end of the first diode D1' is coupled to the signal line. The negative end of the second diode D2' is coupled to the gate electrode of the second TFT 02, while the positive end of the second diode D2' is coupled to the common electrode 202. The signal line comprises a plurality of data lines 208 (1)~(2) and a plurality of gate lines 210 (1)~(2). The ESD protection circuits 206 (1)~(4) are respectively coupled to between each of the gate lines 210 (1)~(2) and the common electrode 202, and between each of the data lines 208 (1)~(2) and the common electrode 202.

Figure 3:
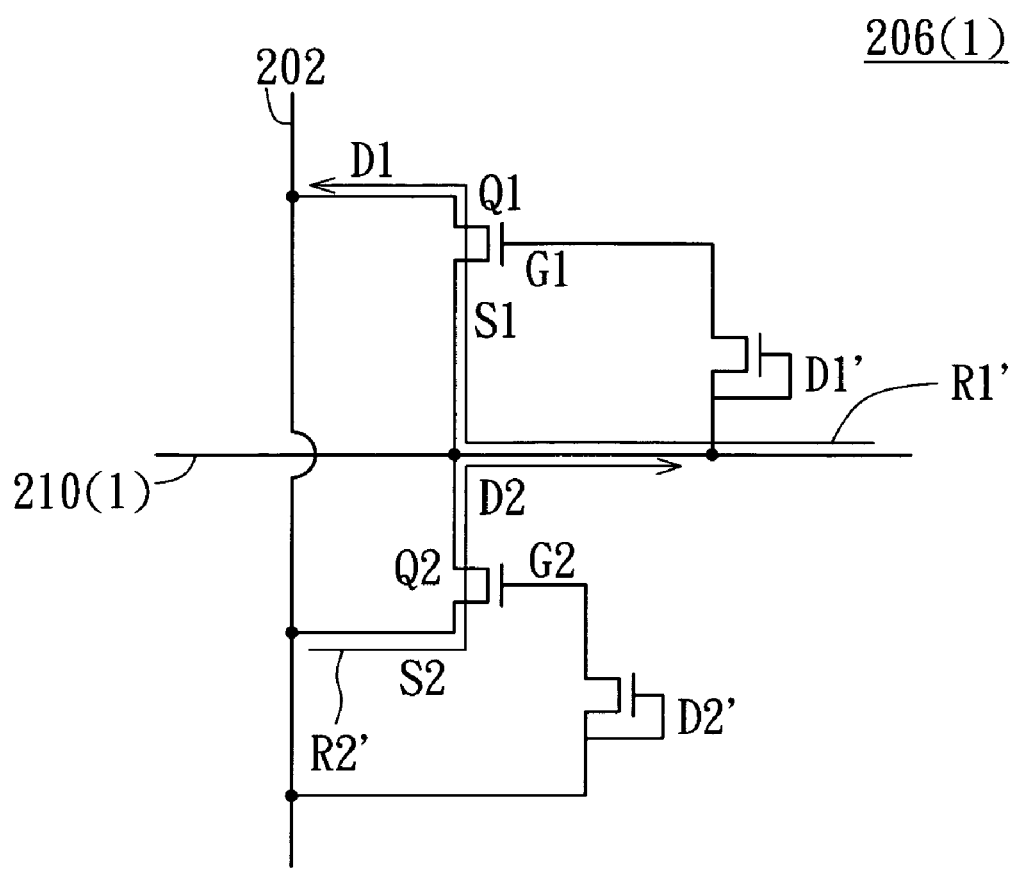
FIG. 3 is a circuit diagram of an ESD protection circuit according to a preferred embodiment of the invention.

Referring to FIG. 3, a circuit diagram of an ESD protection circuit according to a preferred embodiment of the invention is shown. The embodiment is exemplified by ESD protection circuit 206 (1). The ESD protection circuit 206 (1) also comprises a first TFT Q1, a second TFT Q2, a first diode D1' and a second diode D2'. The first TFT Q1 and the second TFT Q2 are preferably NMOS transistors. Therefore, the source electrode S1 of the first TFT Q1 is coupled to the gate line 210 (1), while the drain electrode D1 of the first TFT Q1 is coupled to the common electrode 202. The negative end of the diode D1' is coupled to the gate electrode G1 of the first TFT Q1, while the positive end of the diode D1' is coupled to gate line 210(1). The source electrode S2 of the second TFT Q2 is coupled to the common electrode 202, while the drain electrode D2 of the second TFT Q2 is coupled to the gate line 210 (1). The negative end of the diode D2' is coupled to the gate electrode G2 of the second TFT Q2, while the positive end of the diode D2' is coupled to the common electrode 202. Moreover, the first TFT Q1 and the second TFT Q2 can also be PMOS transistors, and the connection between the two transistors Q1 and Q2 can be achieved by swapping the source electrodes D1 and D2 with the drain electrodes S1 and S2 of original N-type TFTs Q1 and Q2.

When the gate line 210 (1) generates an electrostatic charge, the ESD protection circuit 206 (1) has the electrostatic charge discharged to the common electrode 202 through the first TFT Q1. When the common electrode 202 generates an electrostatic charge, the ESD protection circuit 206 (1) has the electrostatic charge discharged to the gate line 210 (1) through the second TFT 02. That is to say, when the gate line 210 (1) generates a high-voltage electrostatic charge, the corresponding voltage of the electrostatic charge enables the diode D1' to be conducted and the first TFT Q1 to be turned on, so that the electrostatic charge is discharged to the common electrode 202 through the first TFT Q1 as shown in the discharge path R1' of FIG. 3. Similarly, when the common electrode 202 generates a high-voltage electrostatic charge, the corresponding voltage of the electrostatic charge enables the diode D2' to be conducted and the second TFT Q2 to be turned on, so that the electrostatic charge is discharged to the gate line 210 (1) through the second TFT Q2 as shown in the discharge path R2' of FIG. 3.

By means of the circuit structure of the ESD protection circuit 206, the present embodiment can largely reduce the required area of the circuit layout. A conventional ESD protection circuit comprises 6 diodes whose channel width W is about 140~152 um. In the ESD protection circuit 206, the transistors Q1 and Q2 and the diodes D1' and D2' are implemented by amorphous silicon TFTs whose channel widths only require 10~12 um. Under the same channel length L and the gate line width W, the W/L ratio for a conventional amorphous silicon TFT is about 140/9, while the W/L ratio for the amorphous silicon TFT of the present embodiment is about 12/9. Compared with a conventional circuit layout which requires an area of 269 um×188 um, the ESD protection circuit 206 (1) of the present embodiment only requires an area of 159.5 um×148 um, which is 26,966 um$^2$ or 0.46 times smaller than a conventional one.

Figure 4:
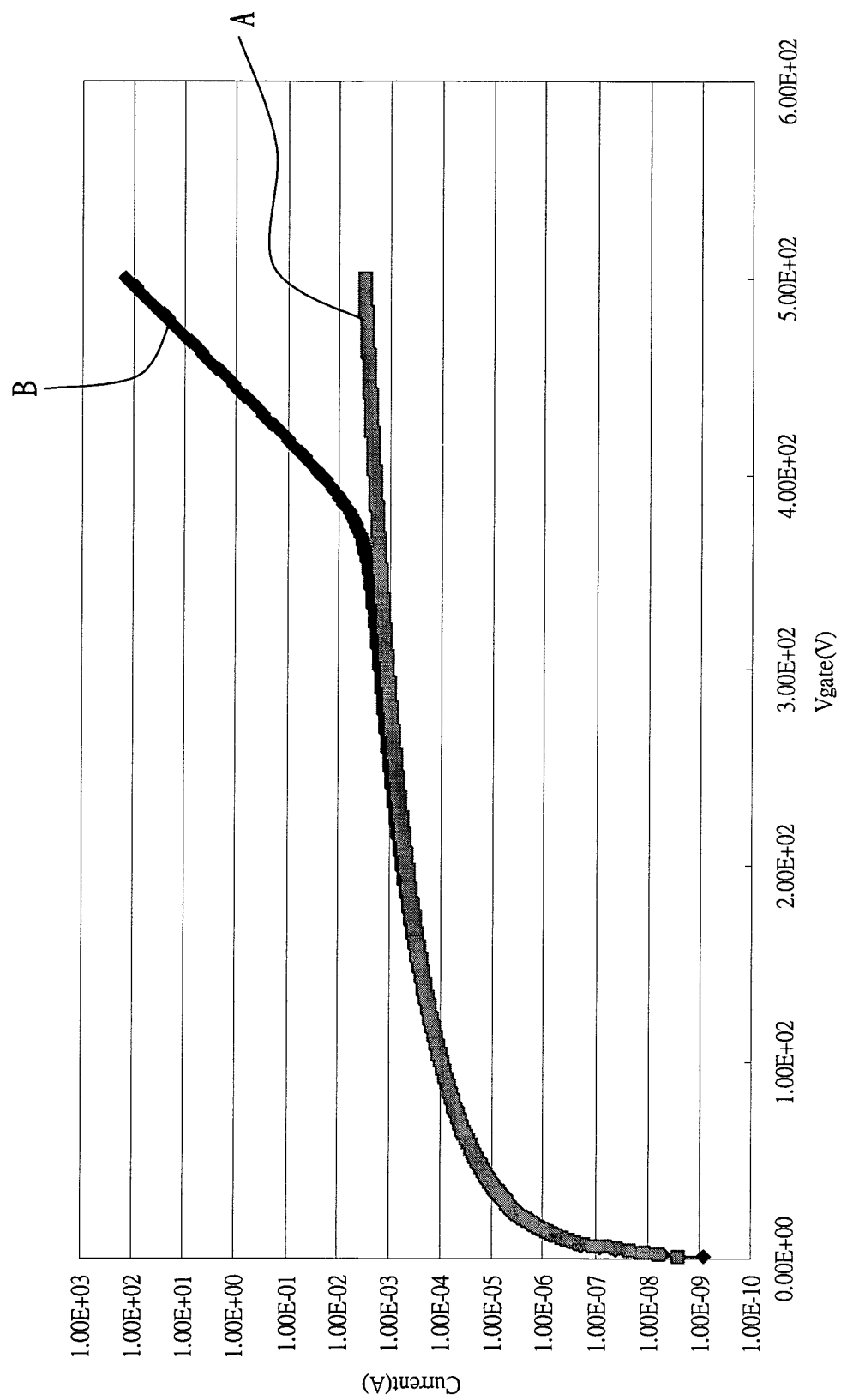
FIG. 4 is a circuit characteristic diagram simulated by an AIM spice.

In terms of the effect of electrostatic protection, the ESD protection circuit 206 of the present embodiment is better than a conventional ESD protection circuit. Referring to FIG. 4, a circuit characteristic diagram simulated by an AIM spice is shown, wherein the x-axis representing the static electricity on the gate line 210 uses voltage V as the unit of measurement, while the y-axis representing currents uses ampere A as the unit of measurement. Curve A shows the relation between the electrostatic voltage and the current of conventional ESD protection circuit. Curve B shows the relation between the electrostatic voltage and the current of ESD protection circuit 206. It can be seen from FIG. 4 that the ESD protection circuit 206 almost has the same effect with the conventional ESD protection circuit when the electrostatic voltage is below about 350 V. Once the electrostatic voltage is over 350 V, the electrostatic current flowing through the ESD protection circuit 206 is larger than that flowing through the conventional ESD protection circuit. This means that the ESD protection circuit 206 increases along with the electrostatic voltage and has a faster rate in discharging electrostatic charges. The method of the present embodiment is faster in discharging electrostatic charges than the conventional method, and can better protect the pixel circuit from being damaged by static electricity of high-voltages.

The ESD protection circuit and the ESD protection method thereof disclosed in the above embodiment of the invention use 4 TFTs to implement the diodes and the transistors of the ESD protection circuit. Furthermore, the circuit structure of the ESD protection circuit not only reduces the area of circuit layout, but also provides a better ESD protection than a conventional circuit.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An electrostatic discharge (ESD) protection circuit for a liquid crystal display having a signal line and a common electrode, comprising:
   a first thin film transistor (TFT) having a first source/drain electrode and a first drain/source electrode, wherein the first drain/source electrode and the first source/drain electrode are coupled to the signal line and the common electrode, respectively;
   a first diode having a first positive end and a first negative end, wherein the first negative end is coupled to the gate electrode of the first TFT, and the first positive end is coupled to the signal line;
   a second TFT, having a second source/drain electrode and a second drain/source electrode, wherein the second drain/source electrode and the second source/drain electrode are coupled to the signal line and the common electrode, respectively; and
   a second diode, having a second positive end and a second negative end, wherein the second negative end is coupled to the gate electrode of the second TFT, and the second positive end is coupled to the common electrode;
   wherein when a first electrostatic charge is generated on the signal line, the corresponding voltage of the first electrostatic charge enables the first diode to conduct, so that the first electrostatic charge is discharged to the common electrode through the first TFT, and when a second electrostatic charge is generated on the common electrode, the corresponding voltage of the second electrostatic charge enables the second diode to conduct, so that the second electrostatic charge is discharged to the signal line through the second TFT.

2. The protection circuit according to claim 1, wherein the first diode is a TFT.

3. The protection circuit according to claim 1, wherein the second diode is a TFT.

4. The protection circuit according to claim 1, wherein the first TFT is an N-type TFT, the drain electrode of the first TFT is coupled to the common electrode, and the source electrode of the first TFT is coupled to the signal line.

5. The protection circuit according to claim 4, wherein the first TFT is an N-type amorphous silicon TFT.

6. The protection circuit according to claim 1, wherein the second TFT is an N-type TFT, the drain electrode of the second TFT is coupled to the signal line, and the source electrode of the second TFT is coupled to the common electrode.

7. The protection circuit according to claim 6, wherein the second TFT is an N-type amorphous silicon TFT.

8. The protection circuit according to claim 1, wherein the signal line is a data line.

9. The protection circuit according to claim 1, wherein the signal line is a gate line.

10. An electrostatic discharge (ESD) protection method applied between a signal line and a common electrode of a liquid crystal display, comprising:
    providing an ESD protection circuit comprising a first thin film transistor (TFT), a second TFT, a first diode and a second diode;
    enabling the first diode to be conducted and the first TFT to be turned on by the corresponding voltage of the first electrostatic charge when a first electrostatic charge is generated on the signal line;
    discharging the first electrostatic charge to the common electrode through the first thin film element;
    enabling the second diode to be conducted and the second TFT to be turned on by the corresponding voltage of the second electrostatic charge when a second electrostatic charge is generated on the common electrode; and
    discharging the second electrostatic charge to the signal line through the second thin film element.

11. The protection circuit according to claim 10, wherein the drain/source electrode and the source/drain electrode of the first TFT are respectively coupled to the signal line and the common electrode, the negative end of the first diode is coupled to the gate electrode of the first transistor, and the positive end of the first diode is coupled to the signal line.

12. The protection circuit according to claim 10, wherein the drain/source electrode and the source/drain electrode of the second TFT are respectively coupled to the signal line and the common electrode, the negative end of the second diode is coupled to the gate electrode of the second transistor, and the positive end of the second diode is coupled to the common electrode.

13. The protection circuit according to claim 10, the signal line is a gate line or a data line.

* * * * *